United States Patent [19]
Weber, Jr.

[11] 3,760,170
[45] Sept. 18, 1973

[54] METHOD AND APPARATUS FOR AUTOMATIC CONTROL

[75] Inventor: Theodore Weber, Jr., Nyack, N.Y.

[73] Assignee: Cam Technology, Inc., Elmsford, N.Y.

[22] Filed: Mar. 19, 1971

[21] Appl. No.: 126,164

Related U.S. Application Data

[63] Continuation-in-part of Ser. No. 63,114, Aug. 12, 1970, abandoned.

[52] U.S. Cl.......... 235/151.11, 235/150.3, 235/156, 318/570, 318/601
[51] Int. Cl...................... G06f 15/46, G05b 19/30
[58] Field of Search.................... 235/151.11, 150.3, 235/151.1, 150.31, 152, 156; 318/569, 570, 600, 605, 640

[56] References Cited
UNITED STATES PATENTS

| | | | |
|---|---|---|---|
| 3,590,226 | 6/1971 | Lane | 235/151.11 |
| 3,609,323 | 9/1971 | McDaniel | 235/151.11 |
| 3,417,303 | 12/1968 | Reuteler | 318/570 |
| 3,536,979 | 10/1970 | Reuteler et al. | 318/640 |
| 3,569,814 | 3/1971 | Rosenberg | 235/151.11 X |
| 3,585,372 | 6/1971 | Bell et al. | 235/151.11 X |
| 3,672,834 | 6/1972 | Corbach | 235/151.11 |

*Primary Examiner*—Felix D. Gruber
*Attorney*—Robert M. Freeman

[57] ABSTRACT

The position Y of one member relative to the position Z of a second member is controlled in accordance with a pre-recorded schedule such that $Y = f(Z)$ where Z is subject to independent control and data is recorded representative of the slope of the function for successive equal increments of Z. Only the six least significant digits of the slope are recorded, the next three significant digits are manually inserted in the apparatus and up dated subject to the carry requirements inferred from the entry of the six least significant digits. The nine-digit slope quantum is then algebraically added $R^s$ times to an accumulated ordinate representation shifted down $s$ places in a register having more than $s$ places. The number is effectively divided by this procedure and is added a sufficient number of times to recover the initial magnitude but at a slower rate. The recovered number is used for controlling the Y member.

17 Claims, 16 Drawing Figures

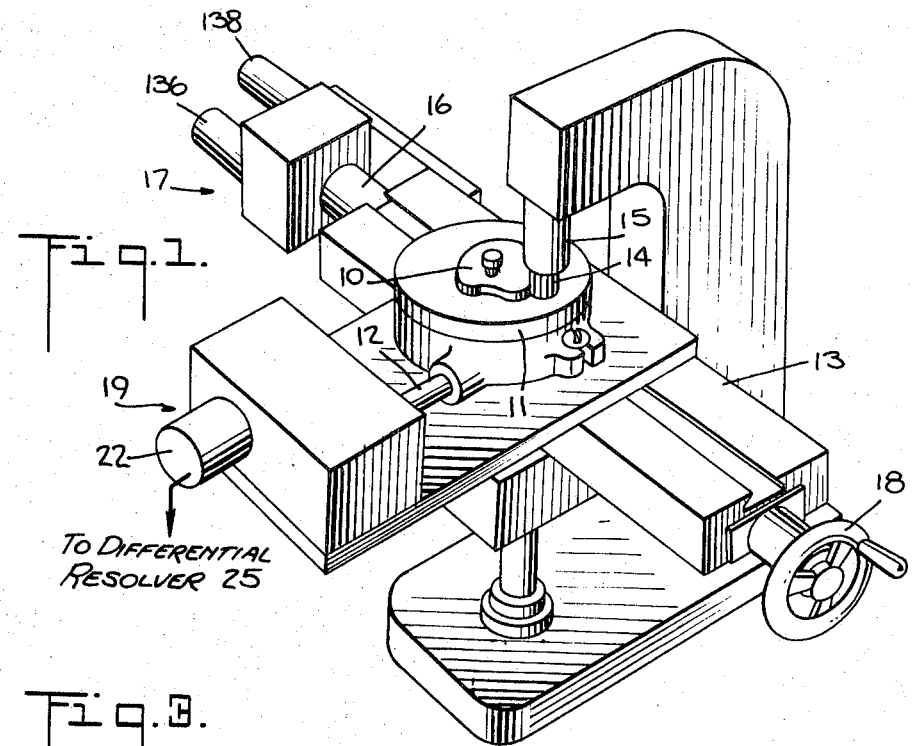
Fig.1.
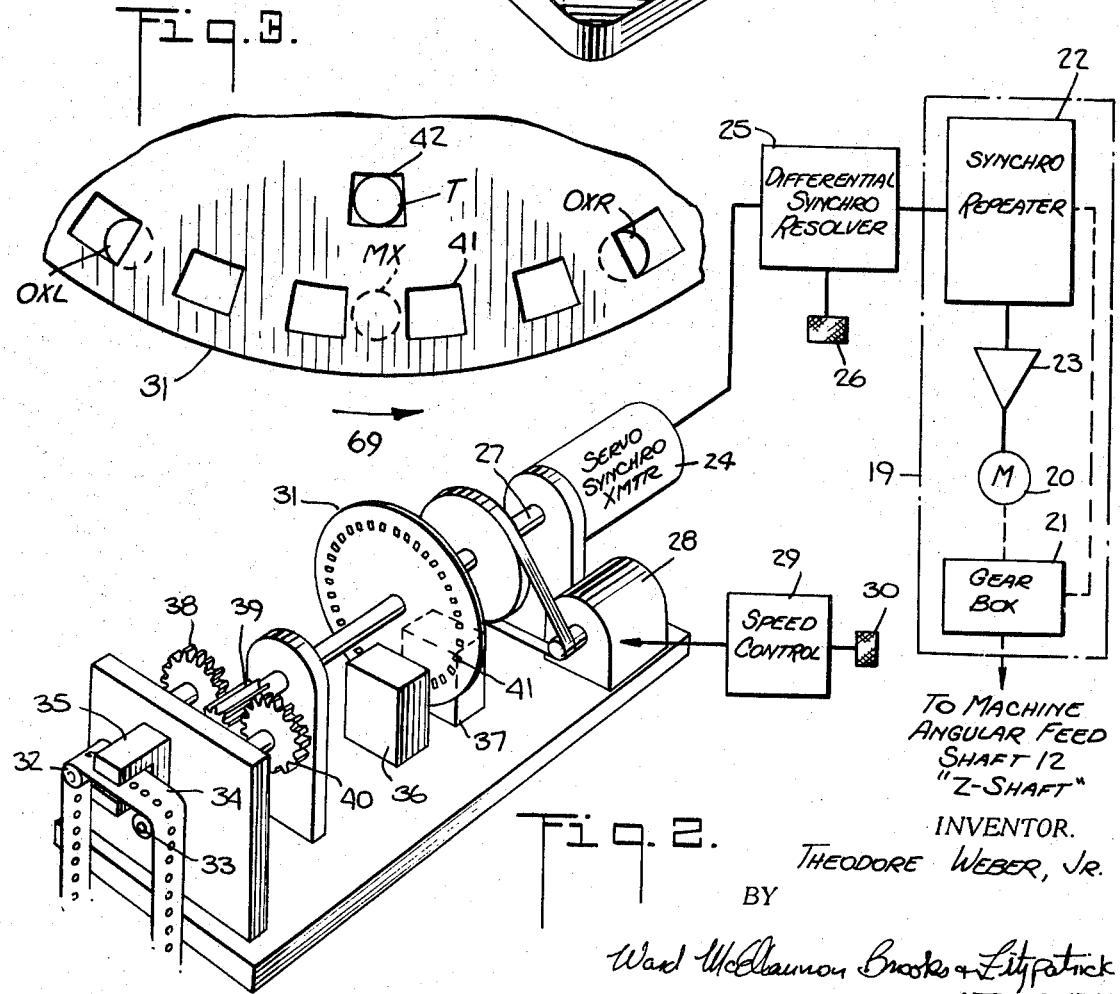
Fig.3.
Fig.2.
INVENTOR.
THEODORE WEBER, JR.

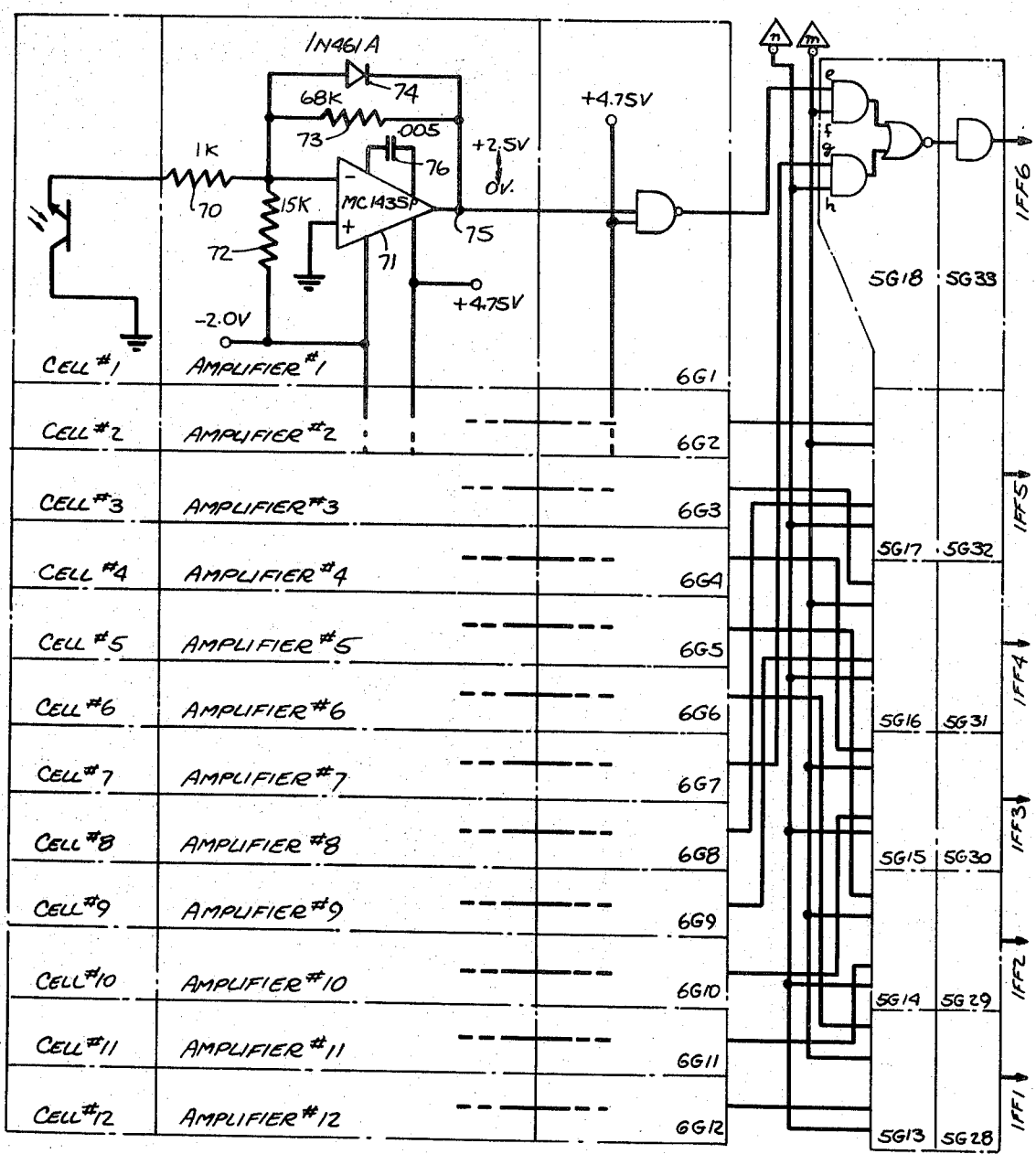
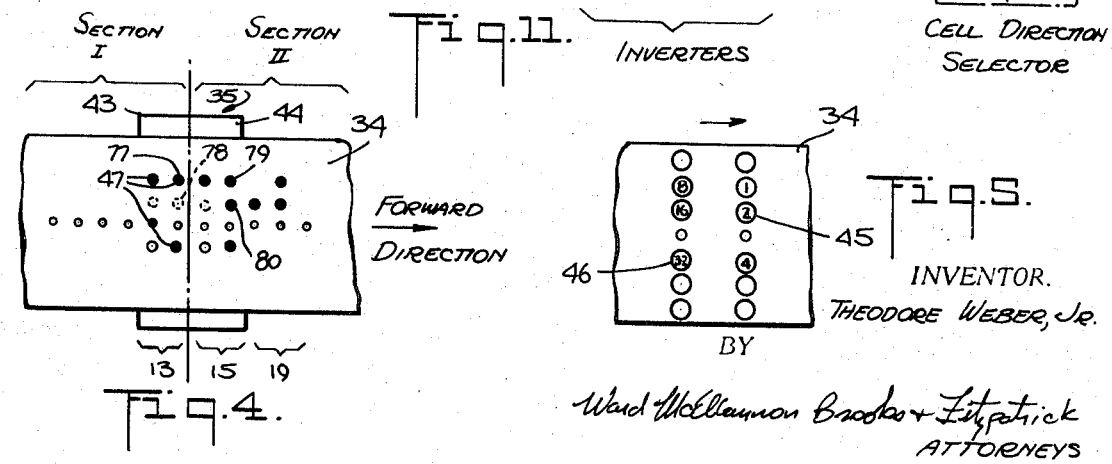

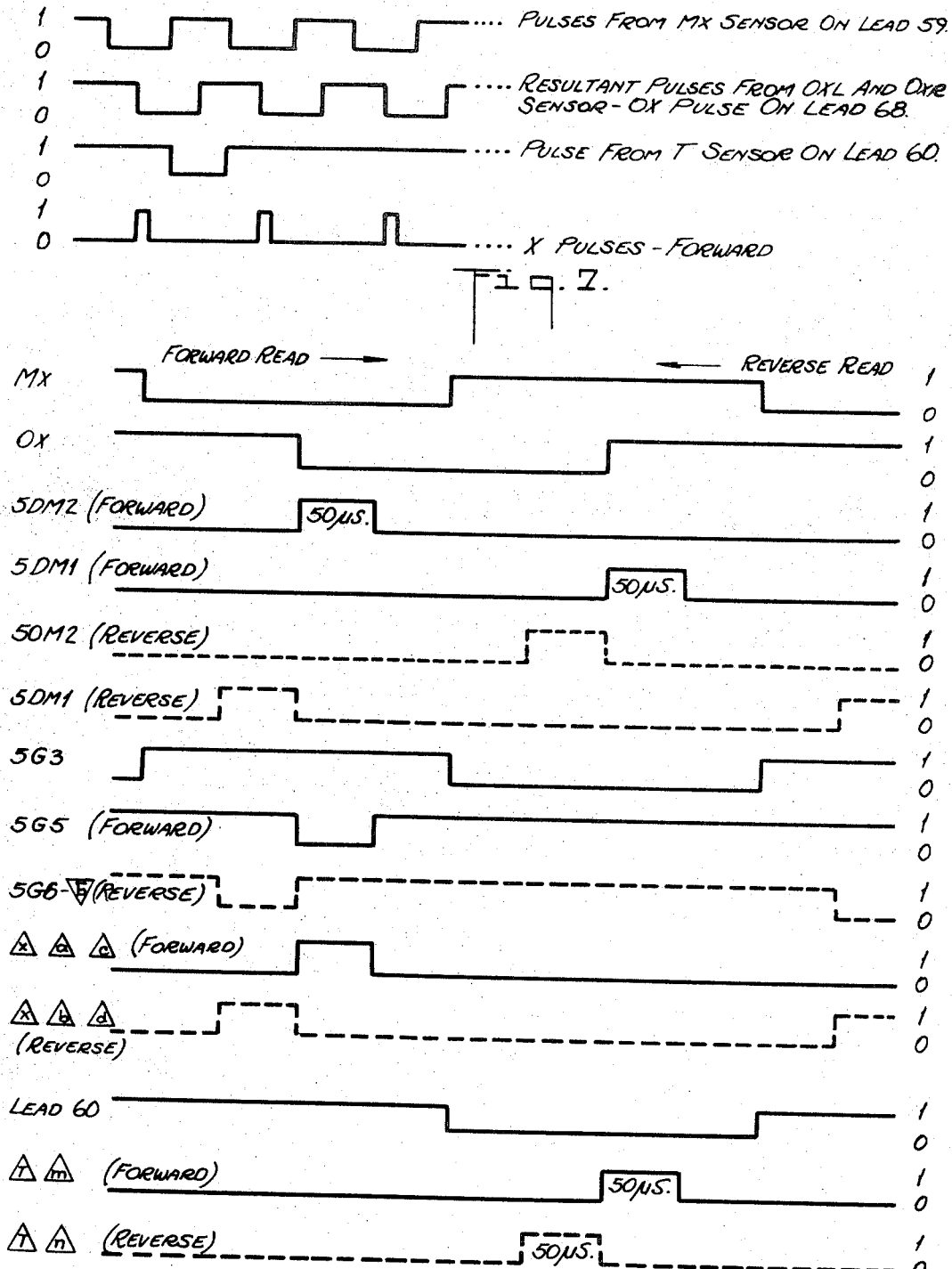

3,760,170

METHOD AND APPARATUS FOR AUTOMATIC CONTROL

This application is a continuation-in-part of application Ser. No. 63,114, filed Aug. 12, 1970 and now abandoned.

The present invention relates to a method and apparatus for moving or controlling the position of a mechanical element as a function of a pre-recorded schedule. More particularly, it is especially applicable to apparatus for automatically controlling a machine tool.

In my Pat. No. 3,248,624, issued Apr. 26, 1966, entitled "Tape Controlled Digital Synchro Simulator For Shaft Control", there is described apparatus which eliminates the cumulative errors inherent in prior stepwise controls by making use of the dimensional information in a more direct manner such that each adjustment is substantially independent of any prior adjustment. For this purpose, the dimensional information is computed, preferably in binary notation, and only a given number, e.g., six of the least significant digits are used for control. It will be understood that the maximum value significance of a six-digit binary number is 63. As described in my aforementioned patent, the use of six binary digits permits a shaft to be controlled in terms of 64 definable positions; and the apparatus described therein is capable of rotating a shaft toward each definable angular position in that direction which requires the least movement.

Another approach has been described and claimed in my Pat. No. 3,244,019, issued Apr. 5, 1966, entitled "Automatic Machine Tool Control." The device disclosed in the last mentioned patent employs a variable speed drive for continuously positioning a movable member. The control is effected by periodically adjusting or controlling the speed of the member in accordance with a pre-recorded schedule. The variable speed drive employed in the apparatus is a ball and disc integrator. As is well known, such integrators while having considerable accuracy are nevertheless not perfect and can give rise to cumulative errors. Therefore, in order to determine the displacement accurately, there is also provided means for periodically checking or comparing the displacement with a recorded schedule and for correcting the speed in case of any error. While the apparatus described in Pat. No. 3,244,019 provides greater flexibility in control and greater range of control than the apparatus described in Pat. No. 3,248,624, the overall capability is still somewhat limited.

Therefore, an object of the present invention is to provide a manyfold improvement in the versatility and capacity of a mechanical member positioning control system.

Another object is to take full advantage of digital techniques in controlling the movement or position of a member as a function of a pre-recorded schedule.

A still further object is to provide apparatus for expanding the range of control afforded while economizing on recorded data and quantity of recording media employed.

Another object of the invention is to provide a control for a machine tool wherein the control determines the relationship between a dependent variable and an independent variable while the independent variable is under the exclusive and unlimited control of the machine tool operator.

In accordance with one aspect of the invention, there is provided apparatus for smoothly moving a member between discrete positions under the control of discrete numerical data quantities representing the differential displacement between successive adjacent positions, which apparatus comprises in combination: means for repeatedly adding for one direction of movement or subtracting for the opposite direction of movement a numerical data quantity to or from a register $R^s$ times where the numerical data quantity has a predetermined number of digits of radix R, means for accumulating the overflow of orders higher than $s$, and means for utilizing the overflow as it is received one bit at a time for controlling the movement of the member.

In accordance with a further aspect of the invention, apparatus is provided for controlling the position of a member in accordance with a pre-recorded schedule wherein a datum unit of only the $n$ least significant digits of each data quantity is recorded and the maximum difference in value between successive data quantities is less than one-half the maximum number value of an $n$ digit number, comprising in combination: means for entering into the apparatus one datum unit at a time, means for storing in the apparatus the next higher ordered $t$ digits after said $n$ digits for defining the previously entered data quantity to $(t + n)$ digits, means for comparing the value significance of the newly entered datum unit with that of the immediately preceding datum unit entry to determine the presence or absence and direction of any carry to the $(n + 1)$ order, means for algebraically adding any said carry to the $t$ digits from a preceding entry to provide a new $t$ digit entry corresponding to the newly entered datum unit, and means for controlling the position of the member as a function of the entered $(t + n)$ digits.

Further in accordance with the invention apparatus is provided for controlling the position Y of one member relative to the position Z of a second member in accordance with a pre-recorded schedule such that $Y = f(Z)$ where Z is subject to independent control and data is recorded representative of the slope of the function for successive equal increments of Z, the apparatus comprising in combination: means for selectably reading the recorded data from a recording media in one sequential direction or the opposite sequential direction, means coupling the reading means to the second member for correlating the direction of controlled movement of the second member with the selected direction of reading the recorded data, and means for controlling the position of the one member as a function of the recorded data.

The invention will be better understood and appreciated after reading the following detailed description of a presently preferred embodiment thereof with reference to the accompanying drawings in which:

FIG. 1 is a perspective view of a milling machine adapted for automatic control and to which the apparatus constructed in accordance with the invention may be applied;

FIG. 2 is a perspective view showing somewhat diagrammatically the tape reading head and mechanism for driving same along with a timing disc;

FIG. 3 is a fragmentary view of the timing disc employed in the structure of FIG. 2;

FIG. 4 is a view of the punched tape used in carrying out the invention;

FIG. 5 is a fragmentary view of one section of the punched tape showing the code employed in carrying out the invention;

Figure 6:
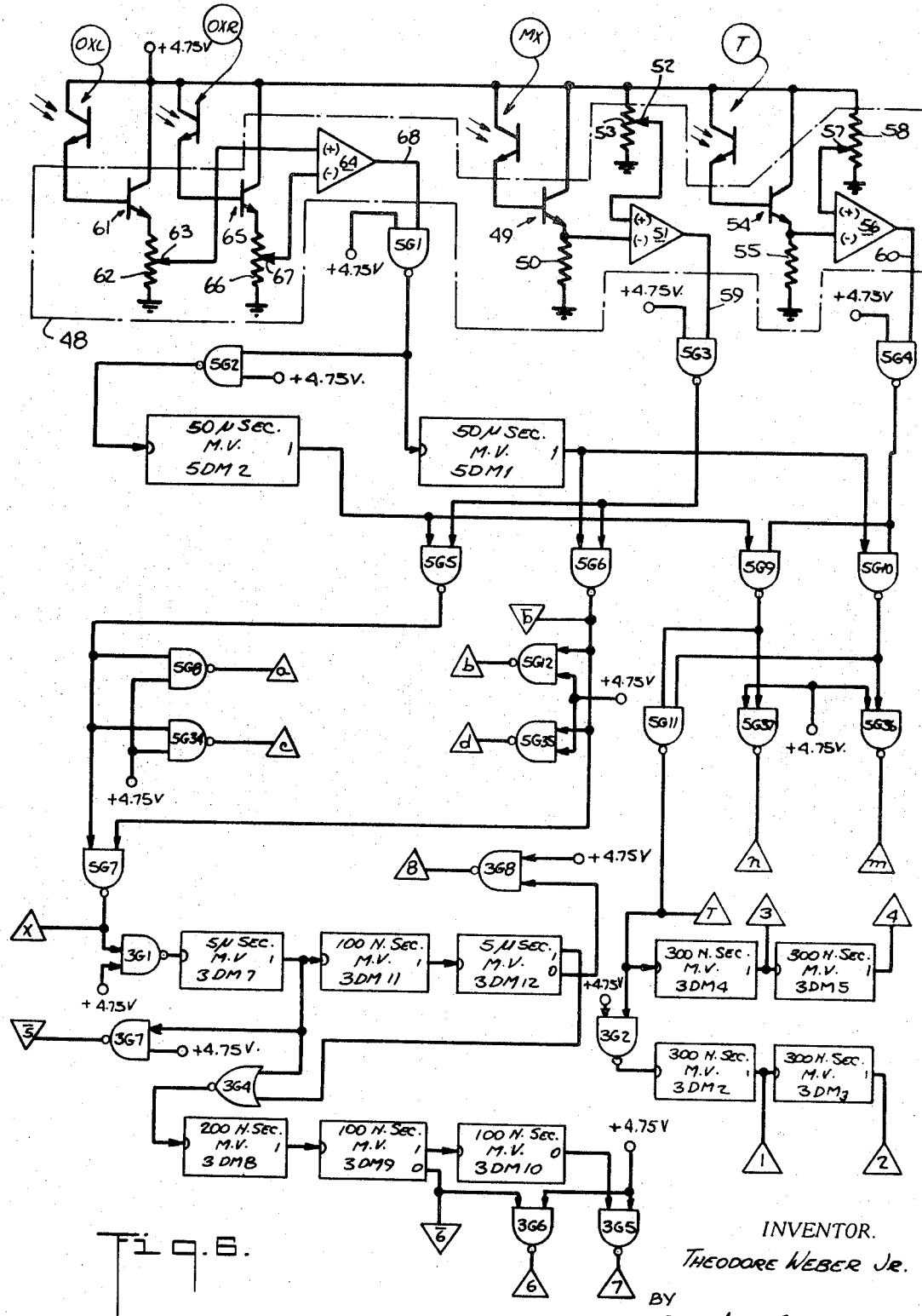
FIG. 6 is a schematic diagram illustrating the program or timing pulse generating section of the control apparatus.
Figure 15:
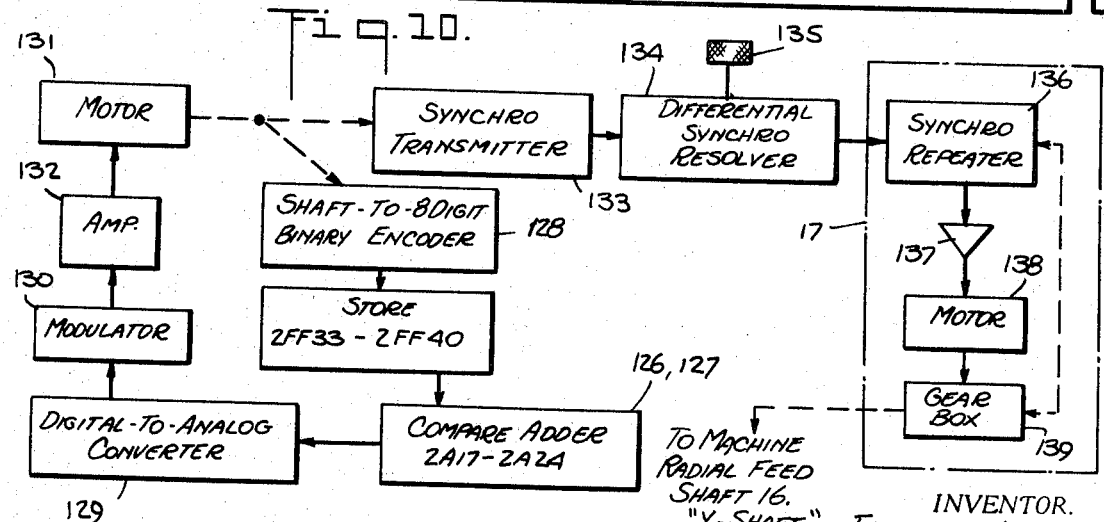
Figure 16:
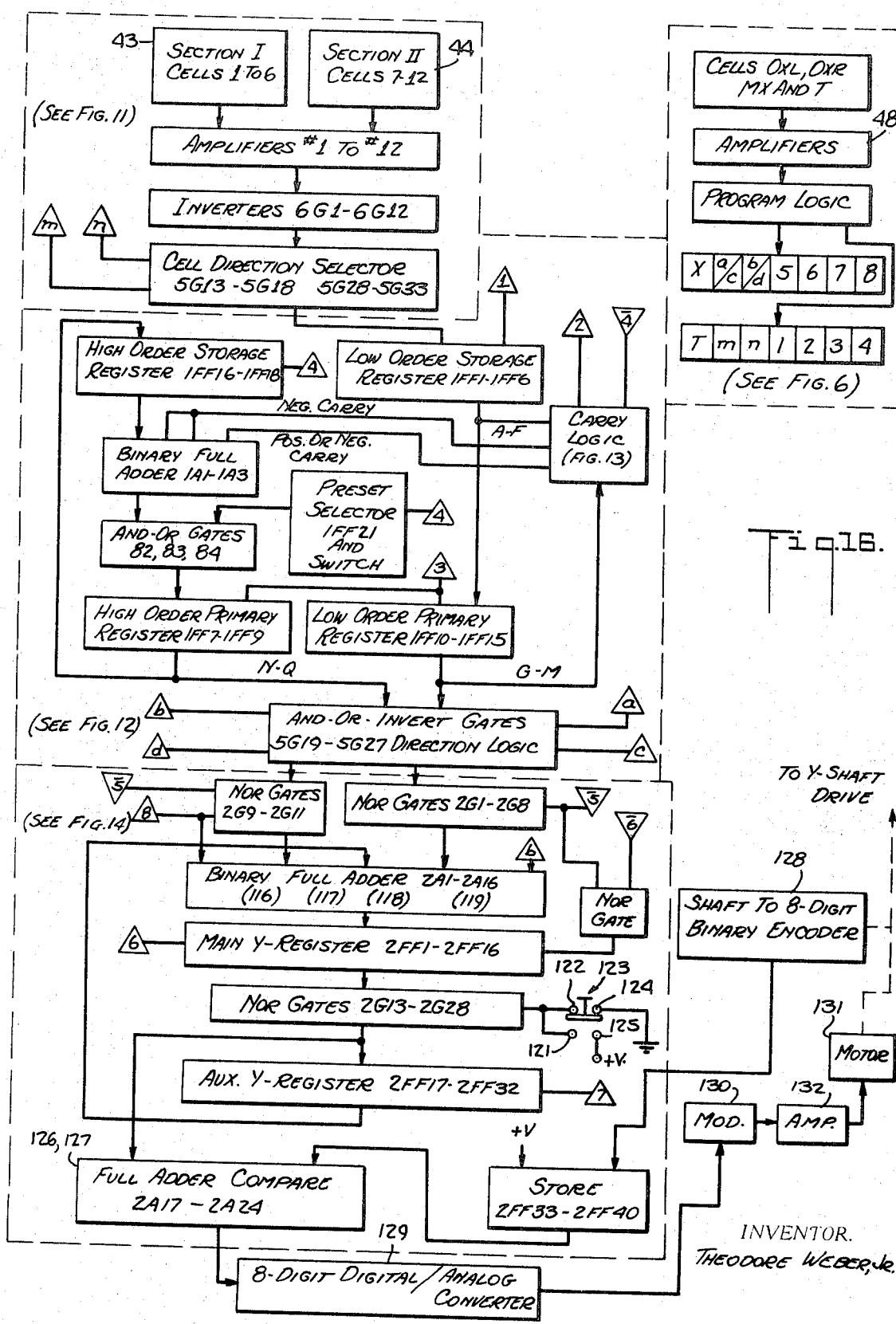

FIGS. 7, 8, 9 and 10 contain waveforms useful in explaining the operation of the circuit of FIG. 6;

FIGS. 11, 12, 13, 14 and 15 are combined schematic and block diagrams which collectively show the control apparatus; and FIG. 16 is a flow chart showing the interconnection of the various components in the overall system.

Throughout the drawings the same reference numerals are used to designate the same parts.

The invention can best be described in terms of the manufacture of a polar type cam. A cam can be completely defined if its slope can be identified for any selected cam angle. This assumes that there is also known the radius of the cam at some particular point. Starting with the equation specifying the functional relationship between the radial distance or ordinate of the cam with respect to the angular position thereof, it is possible to compute the slope at any number of equidistant angular points around the cam. The distance between successive slope computations is selected sufficiently small such that the absolute numerical differences between successive slope magnitudes do not differ by more than one-half the maximum numerical value of the number of digits employed to define such slope. To further explain, six binary digits are employed in each recorded entry. A six-digit binary number has a total capacity of 64 and, therefore, if successive entries do not differ by more than 31 it can always be determined whether the number has increased or decreased in value significance.

For purpose of explanation, it is also convenient to think of the recorded data as a truncated slope designator, numeric in nature. Since the scaling factors of the apparatus are selectable it is not practical to consider the recorded slope data as having precise values. Herein, the data quantities will be referred to as connoting bits per data where the number of bits is equal to the numerical value significance of the encoded unit.

While six binary digits have a total capacity of 64 it is desirable to have much greater range of control. Specifically, it is desired to have the capacity of feeding the apparatus with information covering a range of 512 bits per data with the significance ranging from +255 through zero to −256 in 1-bit steps. This requires nine digits in a radix-2 system. As will appear hereinafter, three additional digits are inferred by the apparatus to provide this range.

Now referring to FIG. 1, a typical cam blank 10 is secured to a rotary feed table 11 driven by shaft 12 and attached to the cross-feed slide or saddle 13. The milling cutter 14, having a diameter equal to the diameter of the follower to be used with the cam, is chucked at the end of the rotatable arbor 15 and held in fixed position while the workpiece is fed to it by the two feeds just mentioned. Adjustment of the cross-feed slide 13 is obtained by rotation of shaft 16 either by means of the drive apparatus indicated generally at 17, or, when that is disengaged, by the hand wheel 18. The shaft 12 is driven by the mechanism indicated generally at 19. As will be explained hereinafter, the workpiece is rotated in synchronism with the reading of the punched tape and the crossfeed is adjusted accordingly. The angular positions of shafts 12 and 16 are represented below by Z and Y, respectively.

The mechanism for driving the shaft 12 of the milling machine is shown in FIG. 2. The shaft 12 is driven by a motor 20 through a gear box 21, the motor being connected in a servo loop with a synchro repeater resolver 22 feeding an amplifier 23 which, in turn, feeds the motor 20. Feedback from the motor to the repeater 22 is provided through the gear box 21. As shown, the repeater 22, amplifier 23, motor 20 and gear box 21 constitute the mechanism 19 shown in FIG. 1.

Signals for the synchro repeater 22 are derived from a servo synchro transmitter resolver 24 whose output is connected through a differential synchro resolver 25 to the synchro repeater 22. The differential resolver 25 is provided with means for manual adjustment symbolized by the knob 26. The servo synchro transmitter 24 is coupled in driven relationship to a shaft 27 which receives its driving power from a motor 28 under the control of a speed control unit 29 having means for manual control represented by knob 30.

Also coupled to the shaft 27 is a timing disc 31 and a pair of sprocket drive wheels 32 and 33. The drive wheels 32 and 33 propel a punched tape 34 past a reading head assembly 35. The timing disc 31 is provided with a plurality of apertures which cooperate with a light source unit 36 and a photocell assembly 37 to produce timing pulses as explained hereinafter. The gears 38, 39 and 40 interposed between shaft 27 and the sprocket wheels 32 and 33 are selected to drive the tape at a speed bearing a predetermined correlation to the speed of rotation of disc 31. The relationship will now be explained.

Referring to FIG. 3, it is seen that the disc 31 has a circular array of equal spaced apertures such as the aperture 41 located near the periphery of the disc. The apertures 41 have a dimension in the circumferential direction which is equal to the spacing between successive apertures. Located radially inwardly of the apertures 41 is a single aperture 42 which may have substantially the same dimensions as the apertures 41. As shown, the aperture 42 is located on a radius of the disc which passes through a space between two apertures 41.

Also seen in FIG. 3 is the relative location of four separate photocells or sensors designated, respectively, by the symbols T, OXL, MX and OXR. These sensors are located in the assembly 37. In the particular embodiment being described there is one slot 42 which cooperates with the sensor T to produce a single pulse for each revolution of the disc 31. The gears 38, 39 and 40 are selected to advance the tape 34 two data rows or two teeth for each revolution of disc 31. In addition, the phasing is such that the aperture 42 comes into registration with the sensor T at the instant the tape is in reading position relative to the reading head 35. The reading position is shown in FIG. 4 to which attention should now be directed.

The reading head 35 consists of two sections, a section 43 to the left of the dot dash line and a section 44 to the right thereof. Each of the sections 43 and 44 is provided with an array of six reading cells distributed in two rows transverse to the tape direction.

In FIG. 5 there is illustrated the particular code employed in encoding a binary digit. Although the tape has space for recording six digits on one line, the illustrative arrangement makes use of two lines for recording in accordance with the system shown in the drawing. Thus, a perforation at location 45 represents a value of 2, a perforation at 46 represents a value of 32, and so forth. The reason for employing a two-line scheme for recording the six digits is because some digital computers that might be used to control the punching of the tape preempt one of the values from single line representation for actuation of the computer stop function. This is true, for example, of the Control Data Corporation LGP-30 Computer.

Returning to FIG. 4, it will be seen that the number 13 is represented by the holes 47 over the section 43 of the reading head. For convenience, this section of the reading head will be referred to as "Section I." Over the other section, 44, hereinafter referred to as "Section II", is the number 15, while to the right of the reading head is represented the number 19. It will be observed that for the forward direction of movement of the tape 34 relative to the reading head 35 each digital representation in the tape will first register with Section I and then with Section II of the reading head. For the reverse direction of movement of the tape, the converse will be true with each digital representation first registering with Section II and then with Section I.

Timing of the control apparatus is accomplished by a series of timing or program pulses produced by the circuitry shown in FIG. 6 to which attention is now directed. The photocells or sensors OXL, OXR, MX and T are connected to individual amplifier stages shown within the outline box 48. Specifically, the sensor MX is connected between a source of positive voltage and the base electrode of a transistor 49 whose emitter electrode is connected to ground through a resistor 50. The collector electrode of the transistor 49 is connected to the source of positive voltage. The junction between resistor 50 and the emitter of transistor 49 is connected to the inverting input of an operational amplifier 51 whose direct input is connected to a slider 52 on a potentiometer 53 whose resistance element is connected between ground and the positive source of voltage.

In similar manner the sensor T is connected between the positive voltage source and the base electrode of a transistor 54 whose emitter electrode is connected to ground through a resistor 55. The collector electrode of transistor 54 is connected to the positive source of voltage while the junction between the emitter electrode and the resistor 55 is connected to the inverting input of another operational amplifier 56. The direct input to operational amplifier 56 is connected to the slider 57 on a potentiometer 58 whose resistance element is connected between ground and the positive source of supply. The outputs from operational amplifiers 51 and 56 are obtained, respectively, on leads 59 and 60.

The sensor OXL is similarly connected to the base electrode of a transistor 61 whose emitter electrode is connected to ground through the resistance element of a potentiometer 62. The slider 63 of potentiometer 62 is connected to the direct input of an operational amplifier 64. The sensor OXR is connected similarly to the base electrode of a transistor 65 whose emitter electrode is connected to ground through the resistance element of a potentiometer 66. The slider 67 of potentiometer 66 is connected to the indirect input of operational amplifier 64. The output from operational amplifier 64 is obtained on a lead 68.

It will be observed that in connection with all of the sensors the emitter electrodes thereof are the ones connected to the respective base electrodes of the corresponding transistors while the collector electrodes of the photocells are connected to the positive source of voltage. As is well known, the cells in question have a high impedance when in the dark and a low impedance when illuminated by light.

Before continuing with the discussion of the logic circuitry in FIG. 6, it will be useful to consider the output obtained on the various leads from the operational amplifiers 51, 56 and 64. These outputs are indicated by the waveforms in FIG. 7. In connection with the particular embodiment being described, the timing disc 31 shown in FIGS. 2 and 3 is provided with 256 apertures 41. Thus, for each revolution of disc 31 there appears on lead 59, 256 negative going pulses as shown on the first line in FIG. 7. While a certain measure of adjustment can be obtained by proper positioning of the slider 52 on potentiometer 53, it is well known that the response of the photocells is affected by various factors. Hence, the pulses obtained from the sensor such as MX may vary in width. To overcome the possible variation in timing of the flanks of the MX pulses, resort is had to the differential action obtained through the auxiliary sensors OXL and OXR. These last two mentioned sensors are connected in a differential manner to the operational amplifier 64 and, by appropriate adjustment of the sliders 63 and 67, cause the signal on lead 68 to rise and fall coincident with the precise halfway registration of the apertures 41 in disc 31 with the two sensors in question as best seen in FIG. 3. Thus, for the position shown in FIG. 3, for the direction of movement shown by the arrow 69, which we shall call the forward direction, the output on lead 68 will be in the process of shifting in the positive direction. As seen in FIG. 7. this occurs in time when the MX sensor is in the dark centered between two of the apertures 41. A consideration of FIG. 3 will reveal that as the disc proceeds in the direction of arrow 69 the OXR sensor is being occluded while the OXL sensor is being uncovered. Referring to FIG. 6, it will be seen that this results in transistor 61 conducting to a greater extent than transistor 65 and causes the direct input to operational amplifier 64 to be positive with respect to the indirect input causing the output on lead 68 to be at a high or move into the high or positive condition. In logic terminology this is the 1 position.

By similar analysis, it can be shown that the voltage on lead 68 will shift in a negative direction to a logical 0 at the moment that the illumination of sensor OXR becomes greater than the illumination of sensor OXL and when the disc 31 is moving in the forward direction. This will occur when the MX sensor is exposed and centered within one of the apertures 41. Thus, the waveform shown in the second line of FIG. 7 is perfectly symmetrical with the positive and negative pulses being equal in width or duration. It should also be observed that the center of the negative going MX pulses occur when the OXL and OXR resultant, referred to as OX, is translating in a negative direction, assuming forward operation, and that the T pulse occurs when the OX signal is translating in a positive going direction. When, however, disc 31 is rotating in the reverse direction the conditions are reversed with the OX pulse going from a logical 0 to a 1 at the center of the logical 0 occurrence of the MX pulse, and from a logical 1 to a 0 when the MX sensor is dark.

Returning now to FIG. 6, the output on lead 68 is applied through NAND gate 5G1 to a NAND gate 5G2 and to the inverting input of a 50 microsecond delay multivibrator 5DM1. Both NAND gates 5G1 and 5G2 have their second inputs connected to a positive source of voltage such that they both function as inverters.

The output from gate 5G2 is connected to an inverting input of a second 50 microsecond multivibrator 5DM2. The true output from multivibrator 5DM1 is connected to one input of each of the NAND gates 5G6 and 5G10. Similarly, the true output of multivibrator 5DM2 is connected to one input of each of the NAND gates 5G5 and 5G9. The second input of NAND gates 5G5 and 5G6 is derived from the output of a NAND gate 5G3 which has one input connected to lead 59 and the other input connected to a source of positive voltage. Similarly, gates 5G9 and 5G10 have their second input connected to the output of a NAND gate 5G4 whose inputs are connected, respectively, to the lead 60 and to the positive source of voltage.

Gate 5G5 has its output connected in parallel to one input of each of the NAND gates 5G7, 5G8, and 5G34. The second input to each of gates 5G8 and 5G34 is connected to the positive source of voltage, while the second input to gate 5G7 is connected to the output of gate 5G6. In addition, the output of gate 5G6 is connected to a terminal $\bar{b}$ and to one input of each of NAND gates 5G12 and 5G35, whose second inputs are connected to the positive source of voltage.

The output from gate 5G7 is connected to a terminal designated "X" and to one input of a NAND gate 3G1 whose second input is connected to the positive source. The output from gate 3G1 is connected to the inverting input of a 5 microsecond multivibrator 3DM7 whose true output is connected to the inverting input of a 100 nanosecond multivibrator 3DM11. The output from multivibrator 3DM7 is also connected to one input of a NAND gate 3G7 and to one input of a NOR gate 3G4. The second input of gate 3G7 is connected to the positive source while the second input of gate 3G4 is connected to the true output of a 5 microsecond multivibrator 3DM12 whose inverting input is connected to the true output of multivibrator 3DM11.

The inverting output from multivibrator 3DM12 is connected to one input of a NAND gate 3G8 whose second input is connected to the positive source.

The output from gate 3G4 is supplied to the inverting input of a 200 nanosecond multivibrator 3DM8 whose true output is connected to the inverting input of a 100 nanosecond multivibrator 3DM9. The true output from multivibrator 3DM9 is connected to the inverting input of multivibrator 3DM10 whose inverting output is connected to one input of a NAND gate 3G5. The other input of NAND gate 3G5 is connected to the positive source. The inverting output from multivibrator 3DM9 is connected to a terminal $\bar{6}$ and also to one input of a NAND gate 3G6 whose second input is connected to the positive source.

As shown in the drawing, the outputs of gates 5G8, 5G34, 5G12, 5G35, 3G7, 3G6, 3G5, and 3G8 are connected, respectively, to terminals $a$, $c$, $b$, $d$, $\bar{5}$, 6, 7 and 8.

In somewhat similar fashion, the output of gate 5G9 is connected to one input of each of the NAND gates 5G11 and 5G37, while the second input of gate 5G11 is connected to the output of gate 5G10 whose output is also connected to an input of gate 5G36. The second input to each of gates 5G36 and 5G37 is connected to the positive source of voltage. The outputs of gates 5G36 and 5G37 are connected, respectively, to terminals $m$ and $n$. The output of gate 5G11 is connected to a terminal T; to the inverting input of a 300 nanosecond multivibrator 3DM4; and to one input of a NAND gate 3G2. The second input of gate 3G2 is connected to the positive source of voltage while the output from the gate is connected to the inverting input of a 300 nanosecond multivibrator 3DM2, the true output of which is connected both to a terminal 1 and to the inverting input of a 300 nanosecond multivibrator 3DM3 whose true output is connected to a terminal 2. The multivibrator 3DM4 has its true output connected both to a terminal 3 and to the inverting input of a 300 nanosecond multivibrator 3DM5 whose true output is connected to a terminal 4.

The operation of the circuit of FIG. 6 can now be explained. It should be understood that each of the multivibrators shown in FIG. 6 which has an input supplied to its inverting input is dormant until a negative going pulse is received at such input. In response to a negative going pulse, the particular multivibrator will go through a cycle developing a positive going pulse at its true output and a negative going pulse at its inverting output. Thus, reference should be had to FIG. 8 wherein the various waveforms which bear no particular directional legend may be read from left to right for the forward direction of operation and from right to left for the reverse direction of operation. Those waveforms containing a legend identifying a particular direction should be read only in connection with such direction of tape operation.

Still referring to FIG. 8, it will be seen that when reading forward or for the forward direction a negative going pulse appearing on lead 68 and identified by OX gives rise to a triggering of multivibrator 5DM2 causing a 50 microsecond positive pulse at its output. This supplies an enabling pulse to both gates 5G5 and 5G9. If at the same time a positive going or true pulse is received on the second input of gate 5G5 from the gate 5G3 due to the inversion of the MX pulse on the lead 59 there will be developed at the output of gate 5G5 a negative going pulse as shown by the corresponding waveform. This negative going pulse will be inverted by the gates 5G8, 5G34 and 5G7, resulting in the positive pulse at terminals X, $a$ and $c$. There will be 256 of these X pulses for each revolution of the timing disc 31. The relative phasing of the X pulses for forward operation relative to the MX, T and OX pulses is shown in FIG. 7.

Due to the fact that there is only a single inversion by gate 5G1 of the OX signal, the multivibrator 5DM1 will trip only when signal OX changes in the positive direction. When the tape is being read in the forward direction with disc 31 rotating in the direction of the arrow 69 of FIG. 3, the multivibrator 5DM1 will deliver its pulse as shown by the waveform on the fourth line of FIG. 8. This occurs when the MX pulse is positive and, therefore, when gate 5G6 is blocked. Hence, there will be no signal at the output of this gate.

When the mechanism is reversed to read the tape in the reverse direction and disc 31 is rotating in the reverse direction, the OX signal will be moving in a negative direction when the MX signal is positive. And will be moving in a positive going direction when the MX signal is negative. Since the gates 5G5 and 5G6 are enabled only when the MX signal is negative, the output from multivibrator 5DM1 will be selected rather than from 5DM2. It will also be observed that with forward movement a positive pulse appears at terminals a and c, while for the reverse direction a positive pulse appears at terminals b and d and a negative pulse at terminal $\bar{b}$ (the output from gate 5G6).

Similarly, during the occurrence of the pulse from the T sensor on lead 60, a positive pulse of 50 microsecond duration will be developed at the T terminal coincident with the operation of multivibrator 5DM1 for the forward direction and with multivibrator 5DM2 for the reverse direction. At the same time terminals m and n will receive a positive pulse for, respectively, the forward and reverse directions. It should be noted that the datum unit to be read from the tape will be in registration with Section I when the tape is moving in the forward direction at the instant that the pulse appears at terminal T, while the section of the tape to be read will be in registration with Section II of the reading head when the pulse appears at the terminal T for the reverse direction of movement.

Figure 9:
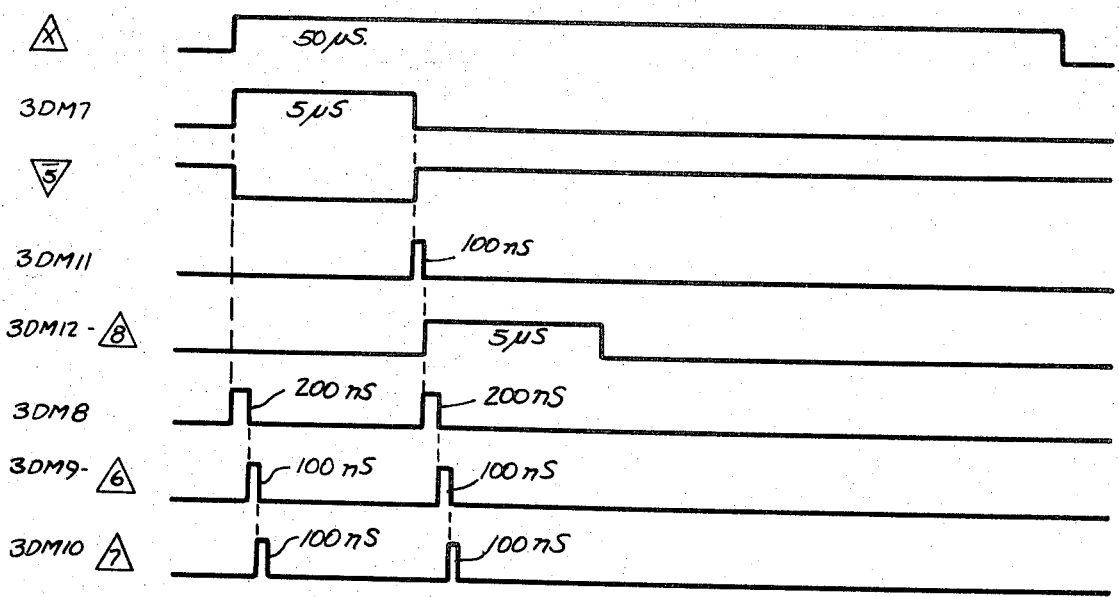

Referring to FIG. 9, it will be seen that coinciding with the rising or leading edge of a pulse appearing at terminal X multivibrator 3DM7 is triggered to deliver a 5 microsecond delay pulse. This results, due to the inversion of gate 3G7, in a negative going pulse at terminal $\bar{5}$. As will be understood, the trailing edge of the pulse from multivibrator 3DM7 causes the multivibrator 3DM11 to generate its 100 nanosecond positive pulse whose trailing edge initiates operation of the multivibrator 3DM12 whose negative or inverting output is further inverted by gate 3G8 to provide the positive 5 microsecond pulse at terminal 8.

The multivibrator 3DM8 is triggered through the NOR gate by both the leading edge of the pulse from multivibrator 3DM7 and the leading edge of the pulse delivered by the multivibrator 3DM12. Each time, the multivibrator 3DM8 delivers a 200 nanosecond positive pulse which trips the multivibrator 3DM9 at its trailing edge to cause it to deliver a 100 nanosecond pulse of a positive nature at its true output and of a negative nature at its inverting output. Thus, terminal 6 is supplied with the two pulses indicated in the second waveform from the bottom of FIG. 9, while the inversion thereof will be supplied to terminal $\bar{6}$. Finally, the multivibrator 3DM10 will be triggered at the trailing edge of the pulse from multivibrator 3DM9 to produce the pulses at terminal 7 indicated by the last line of FIG. 9.

Figure 10:
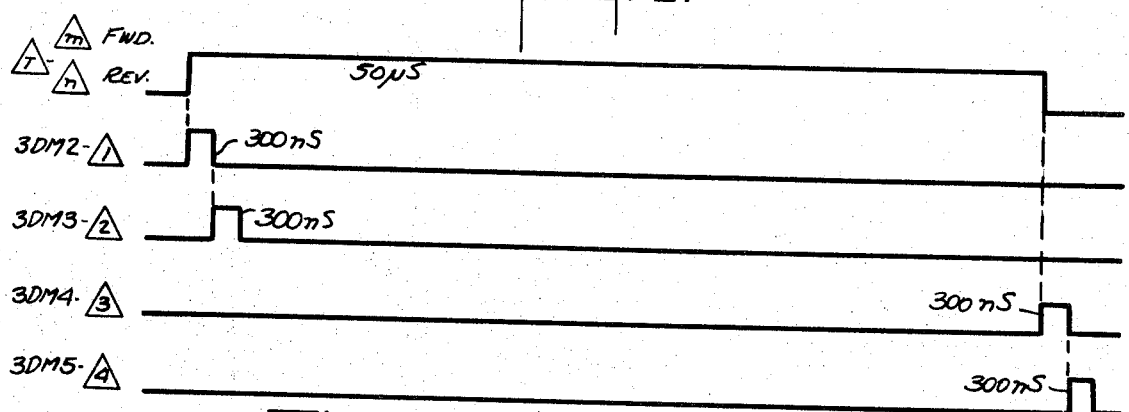

Referring to FIG. 10, the positive going leading edge of the pulse at the output of gate 5G11 or the T pulse will cause the multivibrator 3DM2 to trip generating a 300 nanosecond pulse at terminal 1, the trailing edge of which triggers multivibrator 3DM3 to produce a 300 nanosecond pulse at terminal 2. The trailing edge of the T pulse causes multivibrator 3DM4 to deliver a 300 nanosecond pulse at terminal 3 whose trailing edge initiates action of multivibrator 3DM5 to deliver a 300 nanosecond pulse at terminal 4.

Before proceeding to a detailed discussion of the control circuit, it will be well to have a brief understanding of the functions carried out therein. Thus, a data block or encoded entry on the tape defines the differential displacement, herein called the slope, of the Y variable or member, between the time the particular block is read and the following block is read. In order to effectively eliminate the stepwise motion which would result from displacing all at once the Y member by the comparatively large amount represented by the data block, the data or datum is divided by a predetermined number, e.g., N, and added N times at uniform intervals of the Z member during a datum interval.

The datum that applies during the time between one T pulse and the next is that of the data block being transported between the appropriate two sections of the reading head during that time interval. This is accomplished by sensing the tape direction by the polarity of the OX transition during the T pulse and reading section I if the tape is moving forward or section II if moving in reverse.

It will be observed in FIG. 6 that the various terminals have been identified by discrete symbols such as erect and inverted triangles. It is to be understood that direct connections exist between a terminal in FIG. 6 and a similarly identified terminal in FIGS. 11 through 14. A convention also has been followed of employing an inverted triangle for the NOT or untrue correlary function of a corresponding true function.

Referring now to FIG. 11, the details are shown for the photocells in the reading head 35 and their connection through amplifiers and inverters to the cell direction selector. Since the circuitry for each of the 12 photocells is identical, the details are illustrated only in connection with cell No. 1. The section I of the reading head includes cells No. 1 through No. 6, inclusive, while section II of the head includes cells No. 7 through No. 12, inclusive.

As seen in the drawing, cell No. 1 consists of a light sensitive semiconductor acting as a "current source". The collector electrode is connected to ground while the emitter electrode is connected through a resistor 70 in amplifier No. 1 to the inverting terminal of an operational amplifier 71 whose direct terminal is connected to ground. A resistor 72 is connected between the indirect input of the operational amplifier 71 and a source of negative voltage having a value of minus 2.0 volts. A feedback connection consisting of a resistor 73 in parallel with a diode 74 is connected between the output terminal 75 of the operational amplifier and the indirect input thereof. The usual input compensation capacitor 76 is connected between the input LAG terminals. Values for the various resistors and capacitor are shown on the drawing along with the type designations of the operational amplifier and diode. It will be recognized that the operational amplifier is a dual unit. The second half of the unit which is not illustrated is employed in amplifier No. 2. In similar manner dual units serve amplifiers No. 3 and No. 4, No. 5 and No. 6, and so forth. The characteristics of the amplifier when functioning with a photocell of the type illustrated is such that when the cell is illuminated by reason of a hole in the tape coming into registration therewith, the voltage at output terminal 75 will be held near zero volts due to the limiting action through the diode 74. When the cell No. 1 is dark due to the presence of an opaque section of the tape, the voltage at output terminal 75 will rise to approximately plus 2.5 volts.

The output from the amplifier No. 1 is fed to one input of a NAND gate 6G1 whose second input is connected to the source of positive voltage whereby the gate functions to invert the signal. Each of the NAND gates 6G2 through 6G12 is identical to the gate 6G1 and serves to invert the signal from the corresponding amplifier.

The output from gate 6G1 is supplied to the $e$ input of an AND-OR-INVERT gate 5G18. The $f$ input of gate 5G18 is connected to the $m$ terminal; the $g$ input of gate 5G18 is connected to the ouput of gate 6G7; and the $h$ input of gate 5G18 is connected to the $n$ terminal.

In similar manner, the outputs from gates 6G2 through 6G6 are connected, respectively, to the corresponding $e$ inputs of AND-OR-INVERT gates 5G17; 5G16; 5G15; 5G14; and 5G13. The outputs from gates 6G8 through 6G12 are connected, respectively, to the corresponding $g$ inputs of AND-OR-INVERT gates 5G17; 5G16; 5G15; 5G14; and 5G13. The $m$ terminal is connected to the $f$ input of each of the AND-OR-INVERT gates, while the $n$ terminal is connected to each of the $h$ inputs thereof.

Referring to FIG. 10, it will be recalled that a positive pulse appears on terminal $m$ only for forward operation while such pulse appears on terminal $n$ only for reverse operation. Therefore, for forward operation the AND section connected to terminals $e$ and $f$ of each of the AND-OR-INVERT gates will be enabled while each of the AND sections connected to terminals $g$ and $h$ will be disabled causing the outputs from section I of the reading head 35 to be selected and to provide an output at each of the AND-OR-INVERT gates. It will be understood that for the reverse direction the $g$ and $h$ inputs of each of the AND-OR-INVERT gates will be enabled selecting the outputs from section II of the reading head.

The output of each of the AND-OR-INVERT gates in the Cell Direction Selector is supplied to a NAND gate designated, respectively, 5G33, 5G32, 5G31, 5G30, 5G29, and 5G28. These NAND gates function to invert the signals which are then supplied to the flip-flop circuits 1FF1 through 1FF6 in FIG. 12. In connection with all of the flip-flops shown in the drawings a common convention is employed wherein the D terminal receives the input signal, the C terminal receives the clock or trigger signal, the Q terminal provides a true output while the $\overline{Q}$ terminal provides the NOT or invert output. The six flip-flops, 1FF1 through 1FF6, constitute a Low Order Storage Register. In value significance the flip-flop 1FF6 stores the least significant digit of the number encoded on the tape while the flip-flop 1FF1 stores the most significant recorded digit. By tracing through the circuit it will be seen that the output from photocell No. 1 or No. 7, depending upon the direction of tape operation, controls flip-flop 1FF6. Referring to FIG. 4, cell No. 1 in section I is located at 77. Cell No. 2 is located at 78, and so forth. In section II, cell 7 is located at 79 with cell No. 8 being located at 80. The location of the remaining cells should be evident from a consideration of FIG. 5.

Returning to FIG. 12, it will be observed that all of the clock terminals on the flip-flops in the Low Order Storage Register are connected to program terminal 1. The Q terminals of the flip-flops 1FF1 through 1FF6 are connected, respectively, both to a series of inputs designated by the letters A through F in a carry logic circuit 81 and to the D inputs of a series of flip-flops 1FF10 through 1FF15. The last mentioned six flip-flops represent the low order section of a Primary Register for the slope code, the high order stages thereof being provided by flip-flops 1FF7, 1FF8 and 1FF9. All of the clock terminals for the flip-flops in the Primary Register are connected to terminal 3 in the program section.

The Q outputs from flip-flops 1FF7, 1FF8 and 1FF9 are connected, respectively, to the D inputs of flip-flops 1FF16, 1FF17 and 1FF18 which constitute the high order section of the Storage Register of which flip-flops 1FF1 through 1FF6 make up the low order section. The clock terminals of flip-flops 1FF16 to 1FF18 are connected to terminal 4 in the program circuit. The Q outputs from flip-flops 1FF16 to 1FF18 are connected, respectively, to the A inputs of a binary full adder section of three stages designated 1A3, 1A2 and 1A1. The B inputs for the last mentioned full adder stages are connected to receive their inputs from the carry logic circuit 81 with the $B_1$ terminal of stage 1A1 connected to what is identified as the "positive or negative carry line" and the $B_2$ input and $B_3$ input of stages 1A2 and 1A3 connected to the "negative carry line." This will be explained more fully when the carry logic circuit is described below.

The sum output terminals of the aforementioned full adder sections are connected, respectively, to a corresponding input of AND-OR gates 82, 83 and 84, each composed of three NAND gates interconnected as shown. The second input for the gates 82, 83 and 84 is derived from the Q output of a flip-flop 1FF21 connected for set-reset operation. The set terminal or preset terminal designated PR is connected to the output of NAND gate 1G10 which has one input connected to ground through a resistor 85 and to a contact 86 of a single-pole double-throw switch 87. The other terminal of the NAND gate is connected to the positive source of voltage and to a second contact 88 of the switch 87. A capacitor 89 is connected between the movable contact of the switch 87 and the fixed contact 88. Thus, when the movable contact of switch 87 engages contact 88 the capacitor 89 is discharged. When the switch 87 is manipulated to shift its movable contact to engage contact 86 a positive going voltage pulse is applied to terminal 86 and to the right hand input of gate 1G10 so as to develop a negative pulse at the PR input of flip-flop 1FF21 for setting same. The flip-flop is reset by receipt of a pulse from terminal 4 at its terminal CL. The second input to the right hand NAND gates in each of the AND-OR gates 82, 83 and 84 is connected to the $\overline{Q}$ output of the flip-flop 1FF21. The left hand NAND gates of the AND-OR gates each have an input connected through a separate single pole switch 90, 91 and 92 to the positive source of voltage. The outputs from gates 82, 83 and 84 are connected, respectively, to the D inputs of flip-flops 1FF9, 1FF8 and 1FF7.

For providing direction logic there are provided nine AND-OR-INVERT gates 5G19 through 5G27, inclusive. Designating the four input terminals to each AND-OR-INVERT gate from right to left by the letters $e, f, g$ and $h$, it will be noted that the following connections exist. The $e$ terminals of gates 5G24 through 5G27 are connected to the $b$ terminal in the program circuit. The $a$ terminal in the program circuit is connected to the $g$ inputs of the same four gates 5G24 through 5G27. The $e$ inputs to gates 5G19 through 5G23, inclusive, are connected to the program terminal $d$, while the $g$ input terminals are connected to program terminal $c$. The $f$ input terminals of each of the gates 5G19 through 5G27 are connected, respectively, to the $\overline{Q}$ output of the flip-flops 1FF7 through 1FF15. Similarly, the h inputs of the aforesaid nine gates are connected, respectively, to the Q outputs of the flip-flops 1FF7 through 1FF15. The outputs from the lower order flip-flips 1FF10 through 1FF15 are also connected to a series of inputs G, H, J, K, L and M in the carry logic circuit 81. In addition, the flip-flops 1FF1 through 1FF6 have a $\overline{Q}$ output connected to the inputs A through F in the carry logic circuit 81.

Figure 13:
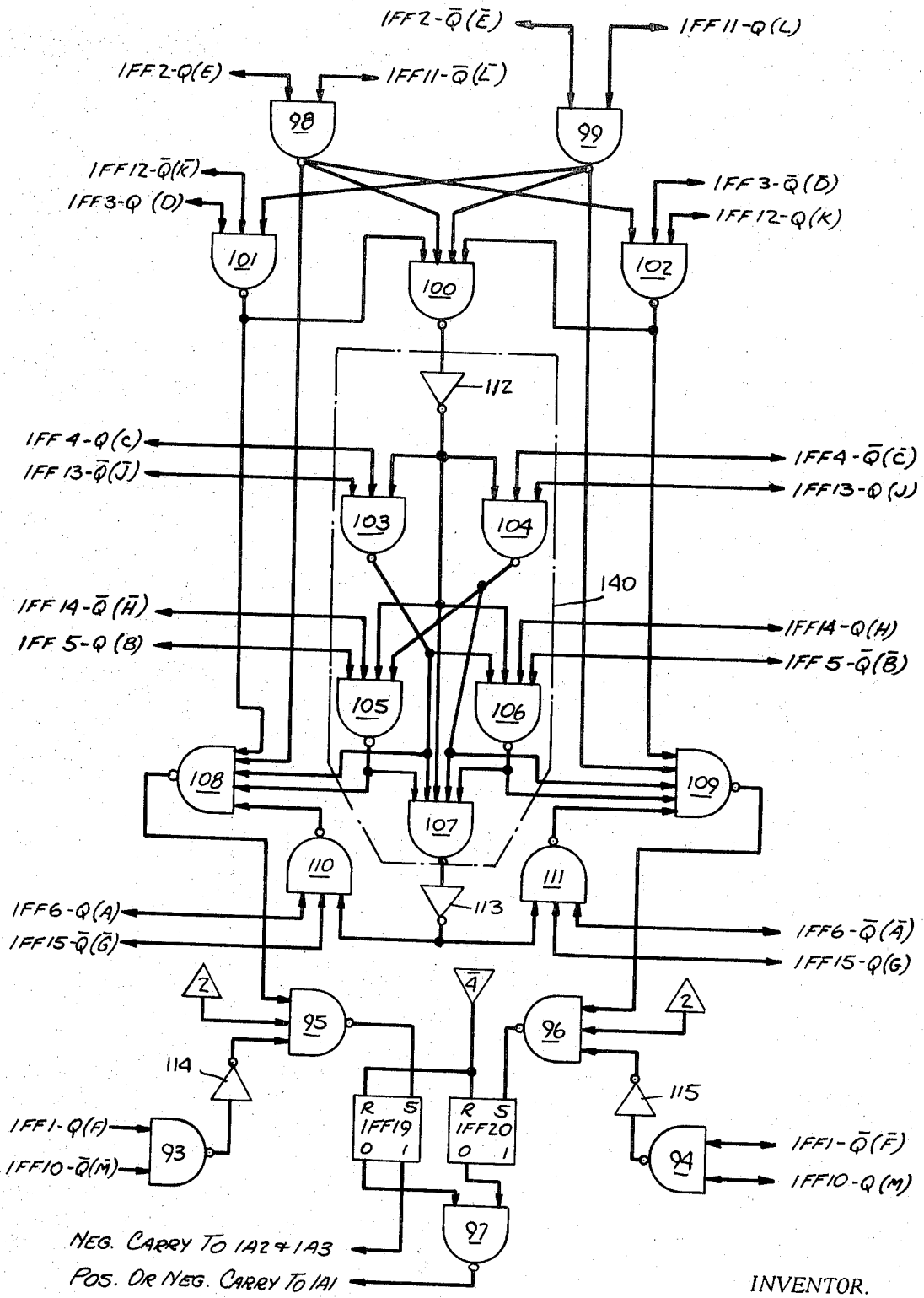

The details of the carry logic circuit 81 are shown in FIG. 13 to which attention is now directed. As seen therein, the carry logic is formed from a plurality of NAND gates 93 through 111, inclusive, interconnected with several NOT circuits 112 through 115, inclusive. The interconnections should be self-evident from the drawing. The convention employed in designating the input connections will now be explained. Thus, the designation "1FF1-Q(F)" indicates that the true F input terminal of the carry logic circuit 81 is connected to the Q output of flip-flop 1FF1. As seen, this connection provides one input to NAND gate 93. The second input to NAND gate 93 is obtained from the NOT or invert M input, i.e., the $\overline{M}$ input terminal of the carry logic which is derived from the $\overline{Q}$ output of flip-flop 1FF10.

The NAND gates 95 and 96 each have one terminal connected to the terminal 2 output of the program circuit. The output of NAND gate 95 is connected to the S or set input of a set-reset flip-flop 1FF19, while the output of NAND gate 96 is connected to the S input of a similar flip-flop 1FF20. The reset or R terminals of flip-flops 1FF19 and 1FF20 are connected to the $\overline{4}$ terminal in the program circuit. On the output side, the low or logical 0 output of flip-flops 1FF19 and 1FF20, are connected to respective inputs of NAND gate 97 whose output provides the "positive or negative carry" to adder stage 1A1. The "negative carry" which is supplied to adder stages 1A2 and 1A3 is obtained from the true logical 1 output of flip-flop 1FF19.

Figure 12:
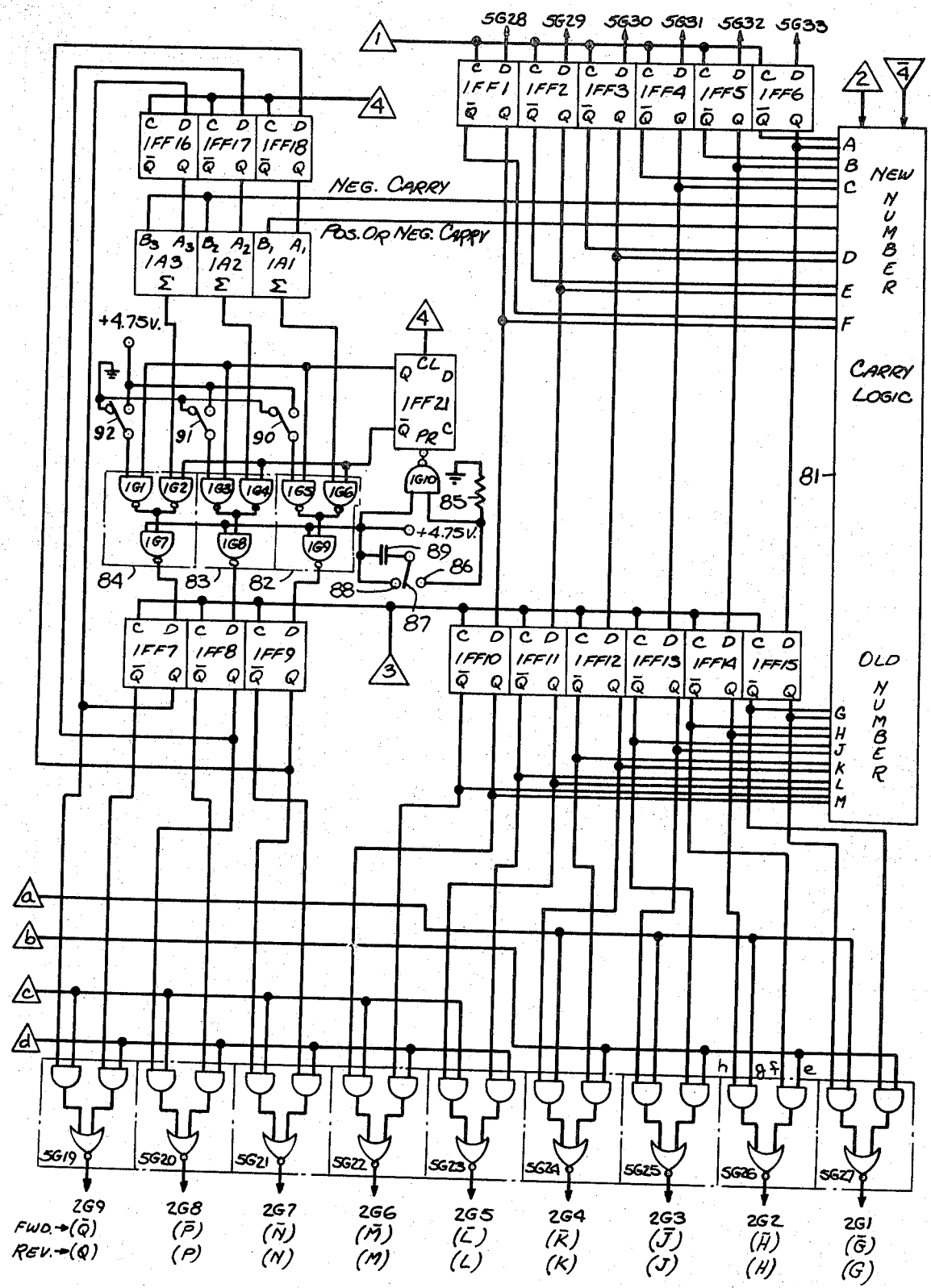
Figure 14:
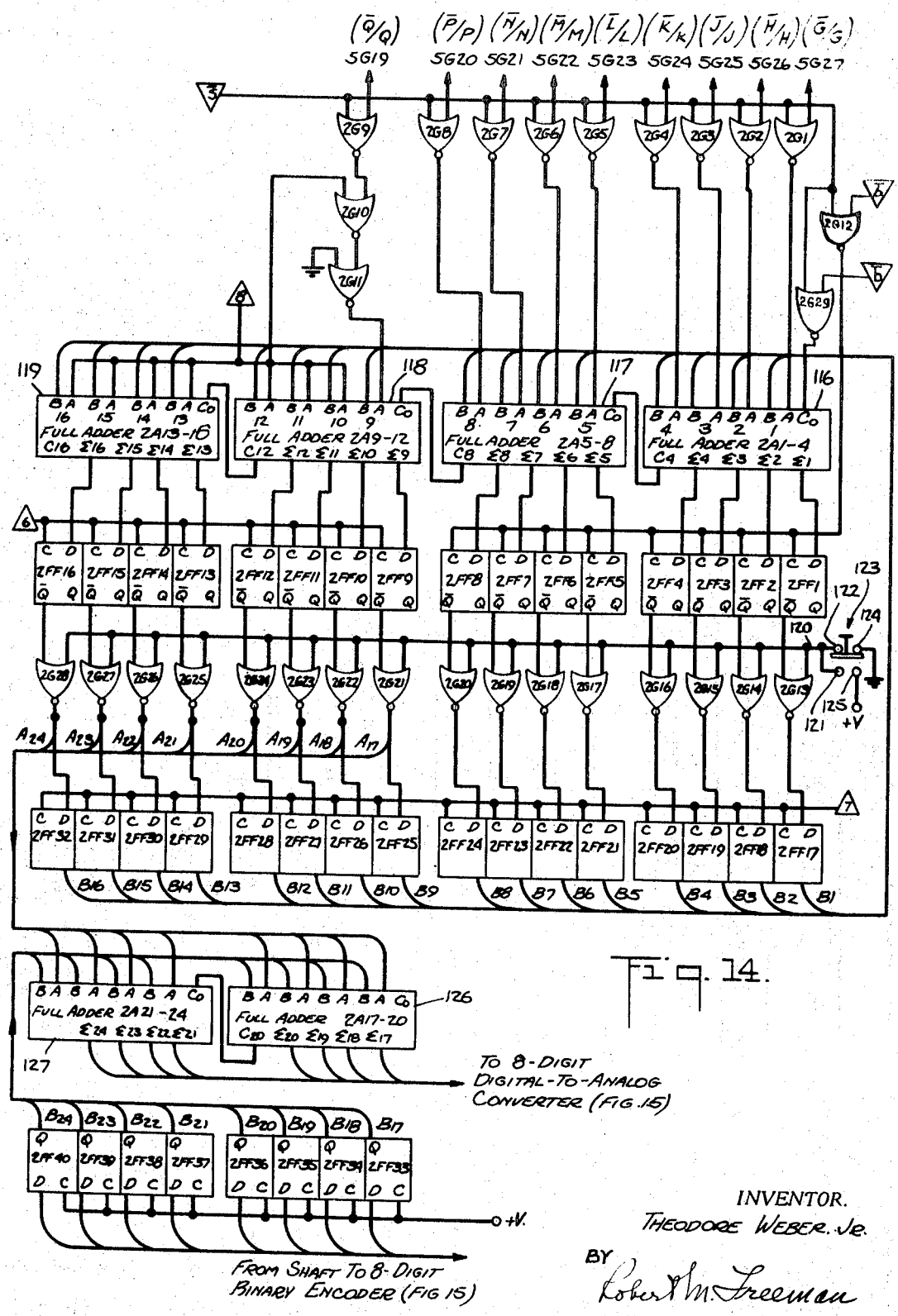

Turning now to FIG. 14, there are nine NOR gates 2G1 through 2G9, inclusive, which each have one terminal connected to the $\overline{5}$ terminal of the program circuit, and another terminal connected to the gates 5G19 through 5G27 in FIG. 12 in the manner designated by the legends appended to the drawings. That is, the gate 2G9 is connected to the output of gate 5G19, and so forth. The various letters within parentheses appearing at the lower portion of FIG. 12 and at the upper portion of FIG. 14 are intended to help identify the signals. When the circuit is operating in the forward direction the signals will be derived from the true outputs of the flip-flops in the primary register but will be inverted by the gates 5G19 through 5G27 and are therefore indicated by the appropriate letter with a bar over it following the conventional indication of the NOT value. It will be understood, however, that when the signals pass through the NOR gates 2G1 through 2G9 they experience a further inversion so that the true value is obtained again.

Four 4-bit binary full adders, 116 through 119, provide 16 stages designated 2A1 through 2A16, inclusive, of full adding capacity. The carry input terminals are designated $C_0$, while the carry output terminals are designated $C_4$, $C_8$, and $C_{12}$. The input terminals are designated by the letters A and B with appropriate subscripts identifying the particular stage. The corresponding outputs are indicated by the letter sigma with appropriate subscripts.

The A inputs to each of adder stages 2A1 through 2A8 are connected, respectively, to the outputs of NOR gates 2G1 through 2G8. The carry input to adder stage 2A1 is connected to the output of a NOR gate 2G29 which has its two inputs connected, respectively, to terminals $\overline{5}$ and $\overline{6}$ in the program circuit. The output carry from each of the final stages of adder circuits 116, 117 and 118 are fed, respectively, to the input carry of each of the next succeeding adder circuit input stages. The A input to adder stage 2A9 is connected to the output of a NOR gate 2G11 which has one input connected to ground and the other input connected to the output of a NOR gate 2G10 having one input connected to the output of NOR gate 2G9 and a second input connected to terminal 8 of the program circuit. The remaining A inputs in the full adder sections 118 and 119 are all connected to terminal 8 in the program circuit.

A set of 16 bistable latches or flip-flop circuits 2FF1 through 2FF16, inclusive, provide a Main Y-Register. The D inputs of stages 2FF1 through 2FF16 are connected, respectively, to the sigma or sum output terminals of the adder sections 2A1 through 2A16 as shown. All of the clock or C terminals of flip-flops 2FF1 through 2FF8 are connected to the output of a NOR gate 2G12 which has one terminal connected to the $\overline{5}$ terminal and the other input connected to the $\overline{6}$ terminal in the program circuit. Flip-flops 2FF9 through 2FF16 have their individual C terminals connected to terminal 6 in the program circuit.

The outputs from flip-flops 2FF1 through 2FF16 are obtained from the $\overline{Q}$ outputs of each. These outputs are fed to corresponding inputs of a plurality of NOR gates 2G13 through 2G28, inclusive. The second input to each of the last mentioned NOR gates is obtained from a bus 120 connected to the two contacts 121 and 122 of a push button or momentary switch 123. The switch is arranged such that it normally connects the bus 120 and contact 122 to ground through the contact 124. When the switch 123 is manipulated a connection is established between terminal 121 and a contact 125 which in turn is connected to a source of positive voltage. Thus, normally a low voltage or low signal is applied to all of the NOR gates 2G13 through 2G28 but upon depressing the switch 123 a high signal is applied to these gates.

An Auxiliary Y-Register is provided by another series of sixteen flip-flops 2FF17 through 2FF32, inclusive. All of the C input terminals of these flip-flops are connected to terminal 7 in the program circuit. The D inputs to these flip-flop circuits receive their signals from the outputs of the NOR gates 2G13 through 2G28, respectively.

The true or Q output of each of the flip-flops 2FF17 through 2FF32 are connected, respectively, to the corresponding B input terminal of the full adder stages 2A1 through 2A16. On the drawing a letter designation appears adjacent the connection from the output of each of the flip-flop stages indicating the particular input terminal of the adder to which that output is connected. Thus, it will be seen that the output of flip-flop 2FF17 is connected to the $B_1$ input terminal of the full adder section 2A1.

Two more 4-bit binary full adders 126 and 127 are interconnected with the carry output from section 126 feeding the carry input of section 127 and collectively constituting a "compare" circuit. The A inputs of the adders in sections 126 and 127, that is, the inputs to stages 2A17 through 2A24, inclusive, are connected respectively to the outputs of NOR gates 2G21 through 2G28. The B inputs to the adder stages 2A17 through 2A24 are connected to corresponding Q outputs of respective flip-flop stages 2FF33 through 2FF40, inclusive, the latter representing a store section.

The clock or C terminals of each of the flip-flops 2FF33 through 2FF40 are connected to a source of positive voltage. The D inputs of these flip-flops are connected to a "shaft to 8-digit binary encoder" 128 shown in FIG. 15. The connection is such that flip-flop 2FF33 will receive the least significant digit from the binary encoder 128 while flip-flop 2FF40 will receive the most significant digit.

The sum or sigma outputs from the full adder stages 2A17 through 2A24 are connected to an "8-digit digital-to-analog converter" 129 shown in FIG. 15.

Now referring more specifically to FIG. 15, it will be seen that the digital-to-analog converter 129 supplies signals to a modulator 130 which, in turn, supplies a motor 131 through an amplifier 132. The motor 131 is connected to drive both a synchro transmitter 133 and the shaft to 8-digit binary encoder 128. Synchro transmitter 133 feeds its output to a differential synchro resolver 134 having a manual adjustment knob or member 135. The output signal from the resolver 134 feeds a synchro repeater 136 whose output is supplied through an amplifier 137 to a motor 138. The motor 138 has its output connected through a gear box 139 to the Y-shaft or to the radial feed for the milling machine. In addition, the gear box provides a feedback to the synchro repeater 136. As shown the components 136 through 139 constitute the control 17 shown in FIG. 1.

OPERATION

In commencing a milling operation, the tool operator secures a blank workpiece 10 to the rotary table of the milling machine in a predetermined angular position. Once attached to the work table the operator can manipulate knob 26 (see FIG. 2) to further adjust the angular position of the Z-shaft relative to shaft 27. Next, by manipulating the knob 135 the operator adjusts the resolver 134 to position the radial feed (the Y-shaft) such that the milling cutter is a predetermined distance from the center of the blank. This distance will depend upon the desired radial distance of a roughing cut for the first pass. The tape which is in the form of a continuous loop will be inserted between the arms of the reading head 35 in appropriate engagement with the sprocket wheels 32 and 33 and in a predetermined initial starting position which is normally indicated on the tape. As mentioned, the tape contains the six least significant digits of the slope code while the operator must insert manually the next three higher order digits. Manual insertion is accomplished by appropriate manipulation, first of switches 90, 91 and 92 and then of switch 87. Closing switch 90 will result in flip-flop 1FF9 being set upon the occurrence of a clock pulse at terminal 3; closure of switch 91 will result in setting of flip-flop 1FF8, and so forth. Thus, the appropriate switches 90, 91 and 92 will be closed and switch 87 will be manipulated from contact 88 to contact 86. This will set the flip-flop 1FF21 causing a logical 1 to be placed on the D inputs of the appropriate flip-flops in the high order primary register, and the setting thereof when the clock pulse appears at terminal 3.

The operator can now advance the speed control 29 with the knob 30 causing motor 28 to drive the shaft 27. The operator will also depress switch 123 for a few seconds.

Upon the generation of a pulse at terminal 7, the auxiliary Y-Register will be reset to all zero. Upon the production of a T pulse, and assuming forward operation of the tape, a pulse will be developed at terminal $m$ and a series of pulses will appear at terminal 1, 2, 3, and 4. The pulse at terminal $m$ will function through the cell direction selector to pass the signals from section I of the reading head to the low order storage register and will set the low order storage register upon the occurrence of the pulse at terminal 1. Initially, the low order storage register will be set to all zero. The same will be initially true of the low order primary register.

Upon reading in the first encoded data quantity there obviously will be required no carry and therefore we can temporarily ignore the events occurring upon the appearance of a pulse at terminal 2. When a pulse appears at terminal 3, the number entered in the low order storage register is transferred to the low order primary register and the number preselected by the switches 90, 91 and 92 will be entered in the high order primary register.

Finally, when the pulse appears at terminal 4, the flip-flop 1FF21 will be reset transferring control of the high order primary register to the output from the binary full adder 1A1 to 1A3; and the number stored in the high order primary register will be entered into the high order storage register. At this point the initial slope code of nine digits will be entered in both the storage register and the primary register.

Assuming continued rotation of the disc 31 with the Z-shaft being driven, there will be produced after the pulse at terminal 4 a series of 256 pulses at terminal X as previously explained.

Still assuming forward operation terminals $a$ and $c$ will be supplied with pulses upon the occurrence of a pulse at terminal X which will apply the true outputs from the primary register to the A inputs of the nine lowest ordered stages 2A1 to 2A9 of the binary full adder upon the occurrence of a pulse at terminal $\overline{5}$. Next there occurs a sequence of pulses at terminals 6 and 7. When the pulse appears at terminal 6, the full adder 2A1 to 2A16 enters into the main Y-register the algebraic sum of the pre-existing total in the auxiliary Y-register and the number in the primary register. When a pulse appears at terminal 7 the number now entered in the main Y-register is also entered in the auxiliary Y-register.

Next, there is produced a pulse at terminal 8. In order to permit negative as well as positive slopes, the slope code is arranged to represent a number exceeding the intended slope by an amount equal to the half scale. In a binary system this is represented by a logical one in the most significant digit place with zeros in the remaining places. The computer preparing the tape is programmed to accomplish this result. As mentioned previously, it is desired to have a capacity of 512 bits. Hence, the value of 256 is added to the actual slope such that a slope of −256 is encoded as zero and a slope of +255 is encoded as 511. Thus, when a pulse appears at terminal 8 a logical 1 is added through the stages 2A9 to 2A16 of the full adder to the eight most significant places in the auxiliary Y-register and the sum is entered into the eight most significant places of the main Y-register. This effectively subtracts by the twos complement technique the numerical value of 256 from the number added in during the previous pulse at terminal $\overline{5}$.

As the disc 31 continues to rotate, successive pulses will appear at terminal X and the number stored in the primary register will be added 256 times to the number stored in the main Y-register. However, it should be observed that while the main Y-register has 16 places the addition is accomplished at the lowest nine places. Considering the eight highest ordered digits in the main Y-register, it will be appreciated that the numerical significance thereof will increase by no more than one bit or number at any one operation of addition of the slope code thereinto. This follows from the fact that the lowest order of the eight highest ordered places is affected only by the carry from the eight lowest orders in the main Y-register. That is, stage 2FF9 is affected only by a carry from stage 2FF8. It should be understood that this carry is accomplished through the full adder.

When the tape is being read in the reverse direction the encoded numbers are entered in the storage register in much the same manner except from section II rather than section I of the reading head. However, now pulses appear on terminals $b$, $\overline{b}$ and $d$ rather than $a$ and $c$ such that the inverted outputs are selected from the primary register.

Using the inverted outputs from the primary register effectively subtracts by adding the ones complement and the number is repeatedly subtracted in response to each pulse at terminal X. However, in order to convert from the ones complement to the twos complement, it is necessary to add a 1 to the lowest order and this is accomplished through use of the pulse at terminal $\overline{b}$ which is fed into the carry input of the first stage, 2A1, of the full adder during the occurrence of the $\overline{5}$ pulse.

In the case of subraction, the addition of the logical 1 to the stages 2A10 through 2A16 of the full adder during the pulse at terminal 8 is to complete the barred or inverted slope code which was added during the pulse at terminal $\overline{5}$. The additional pulse entered through stage 2A9 at this time is added to adjust for the half scale shift.

Whether the operation is forward or reverse, it is necessary upon the occurrence of each subsequent entry of an encoded data quantity into the low order storage register to ascertain by comparison with the number in the low order primary register whether or not a carry is necessary to the high order storage and primary registers. This is accomplished through the carry logic when a pulse occurs at terminal 2. The carry logic circuit carries out the following logical operations in comparing the newly entered datum unit with the preceding one: (a) if the highest order of the datum unit has experienced no change, there is no carry; or (b) if the highest order has changed from a logical 1 to a logical 0, then if the next highest order in which the digits are not alike has changed from 1 to 0, there is a positive carry; if from 0 to 1 there is no carry; or (c) if the highest order has changed from 0 to 1, then if the next highest order in which the digits are not alike has changed from 0 to 1 there is a negative carry, if from 1 to 0, there is no carry. Referring to FIG. 13, it will be seen that the gate 94 has a low output if and only if the F input has the value of logical 0 and the M input has the value of logical 1, which is one of the conditions for a positive carry. The output of NOT circuit 115 is then high. If, also, one or more of the lower order NAND gates 99, 102, 104, 106 or 111 is controlled by a logical 1 at the respective terminals G to L and a logical 0 at the corresponding terminal A to E such that both input leads to the particular gate are high, the output of such gate will be low ane cause NAND gate 109 to have a high output. Under this condition a pulse at terminal 2 will produce a negative going pulse which sets flip-flop 1FF20. The output from flip-flop 1FF20 is inverted by gate 97 such as to put a logical 1 on the positive or negative carry line to adder stage 1A1. This condition prevails until flip-flop 1FF20 is reset by a pulse appearing at terminal $\overline{4}$. Similarly, gates 93, 95, 98, 101, 103, 105 and 110 determine the existence of a negative carry.

In order that only the highest ordered inequality between the digits in the storage andd primary registers should be effective in determining the carry, the output of gates 98 and 99 are impressed as an input on gates 102 and 101, respectively. If either of gates 98 or 99 produces a carry to gates 108 or 109, respectively, the cross-connection inhibits a carry of opposite sign by the lower order gate. Since the outputs of all of gates 98, 99, 101 and 102 are impressed upon gate 100, the output from the latter will be low and the output from NOT circuit 112 will be high only if signls E and L are equal and signals D and K are equal. A carry produced by any of gates 98, 99, 101 or 102 would cause the output of circuit 112 to be low. This would prevent gates 103, 104, 105 and 106 from producing a carry signal. The output leads from gates 103 and 104 to the inputs of gates 106 and 105, respectively, prevent either of the latter from producing a carry opposite to one by the former, as explained previously. If more binary places are used in the tape encoded datum entry, the circuitry for the central digit pair shown within the broken line box 140 would be repeated for every additional two orders in the storage and primary registers. When there is one order remaining it is accommodated by the arrangement of gates including 110 and 111 with NOT circuit 113. Thhe arrangement is such that gates 110 and 111 are effective only if NOT circuit 113 has a logical one output. This can occur only if all higher order comparisons had equal values and failed to produce a carry.

It should also be understood that in order to effect a carry of +1, a logical 1 is added through the full adder stage 1A1 to the lowest ordered section of the high order primary register 1FF9. A carry of −1 is effected by adding a logical 1 to every place of the high order primary register.

As explained previously, the main Y-register contains 16 stages. The slope code in the primary register which is repeatedly added to the accumulated value (conveniently thought of as an "ordinate") in the main Y-register has nine places. However, as described above, there is a subtraction or half scale correction introduced as the addition is performed such that the number effectively added has only eight digits. These digits are added to stages 2FF1 through 2FF8, inclusive, in the main Y-register. However, it is the ordinate accumulated in the higher ordered stages 2FF9 through 2FF16 which is employed to control the Y-shaft. Therefore, the system mayy be viewed as one wherein the addition is performed shifted down in the main register so as to effectively divide the number being added by a certain factor depending upon the number of places involved in the shift. In the particular example the shift involves eight places and effectively divides the number added by 256. However, since the number is added 256 times the initial or encoded value is recovered. But the recovery is accomplished at a very slow rate which eliminates the possibility of an abrupt step function. To all intent and purposes, the variation or change in the lowest utilized order is so slow as to give rise to continuous path motion.

The Y-Shaft drive is coupled to the shaft to 8-digit binary encoder 128 which determines the shaft position within 1/256 of a revolution. The output of the encoder is added, after being stored in the store stages 2FF33 to 2FF40, by the full adder compare circuits 126 and 127 to the value contained in the eight highest orders of the main y-register. So long as the encoder 128 rotates or operates to change its code at a rate equal but opposite to the change in the output derived from the main Y-register the compare adder will maintain its output constant. If the encoder does not change an equal amount, the sum from the compare circuit will change by the difference. This difference is then converted to a DC voltage through the digital/analog converter 129. The voltage output from converter 129 is then compared against a fixed reference voltage in the modulator 130 and, depending upon the difference therebetween, drives motor 131 to restore "equality" between the output from the encoder 128 and the value derived from the main Y-register.

The equality referred to above is not true equality in that there is a half scale shift introduced by arranging for the output from the compare circuit to have a value of 128 when the error is zero. This means that the output of the binary encoder 128 has a value of 128 when the output from the main Y-register has a value of zero. The fixed reference voltage in the modulator 130 is chosen to correspond to the voltage output from the digital/analog converter 129 whichh corresponds to the output from the compare circuit having a value of 128. By virtue of this arrangement the system is capable of both positive and negative operation.

It should be understood that the number accumulated in the main Y-register is truly ordinate in nature. If a negative slope is involved, the acutal numerical value stored in the main Y-register will be reduced for forward tape operation but will be increased for reverse tape operation. With a positive slope encoded in the tape the value in the main Y-register will be increased for forward operation and will be decreased for reverse operation. In other words, the addition is accomplished algebraically.

It was initially assumed that the machine tool operator had set up his tool for a roughing cut. After the tape has completed one cycle through the apparatus and the workpiece has advanced through a complete rotation of 360°, the operator can manually advance the tool by manipulating the differential synchro resolver 134 with knob 135 until the tool reaches the final desired position. A further cycling of the tape will then accomplish a finishing operation in the production of the cam. Naturally, the operator may replace his milling cutter for the final finishing operation.

During the milling operation the tool operator only need control the speed of motor 28 with knob 30. He does this as he observes chip size and in response to auditory observations in the same way as he would feed work to a tool without automatic control. However, with the present automatic control the radial feed will automatically be matched to the position of the Z-shaft and therefore to the angular position of the workpiece. Thus, the actual selection of the cutting speed of the tool is under the absolute control of the human operator.

It should be apparent that a wide range of control can be effected by appropriate choice of the scaling factors through the several gear boxes 21 and 139 and so forth.

For the purpose of generalizing the system, it will be observed that the numerical data quantity represented by the six digits encoded in the tape is algebraically added to for forward motion or subtractdd from for reverse motion a main Y-register $R^s$ times where the numerical data quantity has a predetermined number of digits of radix R. In the particular example, the total data quantity has nine digits of radix 2. The higher ordered sections of the main register represents means for accumulating the overflow of orders higher than $s$. In the present example, $s$ is equal to 8. Also, each data quantity has been increased by a given number H (256 in the present case) such that all data is positive. It should also be recognized that since a radix 2 system is being employed, the number 256 (H) is subtracted by means of adding the twos complement.

It is also convenient to generalize by defining the data quantities as containing P binary digits and defining the binary full adder consisting of sections 116 through 119, as having (P + Q) stages. In the present example P = 9 and Q = 7.

In the appended claims some further letter symbols will be employed having the following meaning: $n$ = number of least significant digits in a datum unit (6 in the present example); $t$ = number of digits added to $n$ to constitute a complete data quantity of P digits (in the present example $t$ = 3); and K = the number of places in excess of $s$ in the main Y-register (K has a value of 8 in the present example).

Having described the invention in connection with a presently preferred embodiment thereof, it should be apparent to those skilled in the art that various changes in construction may be made without departing from the true spirit of the invention as defined in the appended claims.

What is claimed is:

1. Apparatus for smoothly moving a member between discrete positions under the control of discrete numerical data quantities representing the differential displacement between successive adjacent positions comprising in combination: a register, means coupled to said register for repeatedly adding for one direction of movement of said member and subtracting for the opposite direction of movement of said member a numerical data quantity, to or from a quantity stored in said register, $R^s$ times where R is the constant radix of the predetermined number of digits which constitute said numerical data quantity and s is a positive integer greater than zero, means coupled to said register for causing accumulation in said register of the overflow of orders higher than $s$, and means coupled to said register for utilizing said overflow as it is accumulated one bit at a time for controlling the movement of said member.

2. Apparatus according to claim 1, wherein each data quantity has been increased by a number H such that all data is positive, and said means for adding and subtracting comprises means for adding to said register each time a data quantity is added thereto, the twos complement of said number H, said register being binary in nature and R being equal to 2.

3. Apparatus according to claim 2, wherein H equals 256, s equals 8, and said predetermined number of digits are 9 in number.

4. Apparatus for smoothly moving a member between discrete positions under the control of discrete numerical data quantities of P binary digits representing the differential displacement between successive adjacent positions comprising in combination: a binary full adder having (P + Q) stages where both P and Q are positive whole numbers; a first register having a plurality of individual D-flip-flops with respective signal inputs coupled to a corresponding sum output of each of the stages of said adder; a second register having a plurality of individual D-flip-flops with respective signal inputs coupled to a corresponding output of each of said D-flip-flops in said first register and having a respective output individually coupled to an input of a corresponding stage in said adder; means coupled to said D-flip-flops in said first and second register for supplying gating signals sequentially thereto; means for feeding said P binary digits in parallel repeatedly to respective second inputs of the P lowest order stages of said adder; means forr supplying a 1 bit to the second inputs of the (Q + 1) highest order stages of said adder for each time that said P binary digits are fed to said adder; a second binary full adder having (Q + 1) stages; means for feeding the outputs from the corresponding (Q + 1) highest order flip-flops in said first register to a respective first input of each stage of said second adder; means for supplying the respective second inputs of said second adder with a (Q + 1) digit binary coded feedback signal representative of the position of said member; and means for controlling the position of said member as a function of the sum output from said second adder.

5. Apparatus according to claim 4, wherein P = 9 and Q = 7.

6. Apparatus according to claim 4, wherein both said means for supplying said second adder with a feedback signal and said means for controlling the position of said member are interrelated such that as the numerical value of the sum from said second adder increases, the numerical value significance of said feedback signal will decrease and vice versa tending to maintain said sum at a predetermined value.

7. Apparatus for controlling the position of a member in accordance with a pre-recorded schedule wherein a datum unit of only the $n$ least significant digits of each data quantity is recorded and the maximum difference in value between successive data quantities is less than one-half the total capacity of an n digit number, comprising in combination: means for storing data, means for entering into said storing means one datum unit at a time, separate means for storing the next higher ordered $t$ digits after said $n$ digits for defining a data quantity corresponding to a datum unit to $(t + n)$ digits, means coupled to said first storing means for comparing the value significance of each newly entered datum unit with that of the immediately preceding datum unit entry to determine the presence or absence and direction of any carry to the $(n + 1)$ order, means coupled between said last mentioned means and said separate storing means for algebraically adding any said carry to the said $t$ digits in said separate storing means from a preceding entry to provide a new $t$ digit entry corresponding to the newly entered datum unit, and means coupled to an output from both of said storing means for controlling the position of said member as a function of said entered $(t + n)$ digits.

8. Apparatus according to claim 7, wherein $n = 6$ and $t = 3$.

9. Apparatus according to claim 7, wherein coupled to said separate means for storing $t$ digits are means for manually pre-setting said $t$ digits to the most significant figures applicable to the commencement of controlled operation.

10. Apparatus according to claim 7, wherein the datum unit is in binary form and said means for determining any carry comprises a logic circuit for carrying out the following logical operations in comparing the newly entered datum unit with the preceding one:
   a. if the highest order of the datum unit has experienced no change, there is no carry; or
   b. if the highest order has changed from 1 to 0, then if the next highest order in which the digits are not alike has changed from 1 to 0 there is a positive carry, if from 0 to 1 there is no carry; or
   c. if the highest order has changed from 0 to 1, then if the next highest order in which the digits are not alike has changed from 0 to 1 there is a negative carry, if from 1 to 0, there is no carry.

11. Apparatus for controlling the position Y of one member relative to the position Z of a second member in accordance with a pre-recorded schedule such that $Y = f(Z)$ where Z is subject to independent control and data is recorded representative of the slope of the function for successive equal increments of Z, said apparatus comprising in combination: means for selectably reading said recorded data from a recording media in one sequential direction or the opposite sequential direction, means coupling said selectable reading means to said second member for correlating the direction of controlled movement of said second member with the selected direction of reading said recorded data, and means coupled to said selectable reading means under the control thereof for controlling the position of said one member as a function of said recorded data which has been read from said recording media.

12. Apparatus according to claim 11, wherein the data is recorded on punched tape, said selectable reading means comprises two reading heads positioned side-by-side displaced by the distance between adjacent tape entries, and said controlling means includes means for selecting the output from one of said heads when said tape is being read in one direction and for selecting the output from the other of said heads when said tape is being read in the other direction.

13. Apparatus according to claim 11, wherein means are provided in said controlling means for inverting the signs of the slope data as it is utilized in the apparatus when the direction of reading the data is reversed.

14. Apparatus for controlling the position Y of one member relative to the position Z of a second member in accordance with a pre-recorded schedule such that $Y = f(Z)$ where Z is subject to independent control and data is recorded representative of the slope of the function for successive equal increments of Z, said apparatus comprising in combination: means for reading one datum unit at a time in succession from a source of recorded data in which a datum unit of only the n least significant digits is recorded for each data quantity with the maximum difference in value between successive data quantities being kept less than one-half the total capacity of an n digit number, means for storing data coupled to said reading means for storing data read by the latter, means for entering in said data storing means prior to the reading of the first datum unit the value of the next higher ordered $t$ digits after said n digits for defining the data quantity to $(t + n) = P$ digits, means for comparing each datum unit after it is read with the last previously read datum unit and ascertaining whether or not a carry is inferred from the highest order of said $n$ digits to the lowest order of said $t$ digits and means for updating said $t$ digits in said data storing means accordingly, and means for controlling said one member in accordance with said schedule by utilizing the slope information contained in P digits stored in said storing means.

15. Apparatus according to claim 14, wherein said means for controlling said one member comprises a data storage device, means for repeatedly adding for a postive slope or subtracting for a negative slope to or from an accumulated ordinate representation in said storage device, $R^s$ times, the quotient resulting from dividing each P digit data quantity by $R^s$ where the P digits are of constant radix R and $s$ is a positive integer greater than zero, means for determining the overflow in the accumulated ordinate in said storage device to orders higher than $s$, and means for utilizing said overflow from said storage device as it is received one bit at a time to control the movement of said one member.

16. Apparatus of claim 15, wherein said storage device is a register having $(s + K)$ places where K is a positive integer other than zero and the said quotient is obtained by means for performing the addition or subtraction of the P digit data quantity shifted down $s$ places in said register.

17. Apparatus of claim 16, wherein $P = 9$; $R = 2$; $s = 8$; and $K = 8$.

* * * * *

UNITED STATES PATENT OFFICE
CERTIFICATE OF CORRECTION

Patent No. 3,760,170          Dated September 18, 1973

Inventor(s) Theodore Weber, Jr.

It is certified that error appears in the above-identified patent and that said Letters Patent are hereby corrected as shown below:

Column 18, line 8, "ane" should read --and--; line 18, "andd" should read --and--; line 60, after "These" insert --eight--; line 65, "mayy" should read --may--.

Column 19, line 17, "y-register" should read --Y-register--; line 39, "whichh" should read --which--.

Column 20, line 14, "subtractdd" should read --subtracted--.

Column 23, lines 15 and 16, "schedule by utilizing the slope information contained in" should be deleted.

Signed and sealed this 19th day of February 1974.

(SEAL)
Attest:

EDWARD M. FLETCHER, JR.          C. MARSHALL DANN
Attesting Officer                Commissioner of Patents